US007194592B2

(12) United States Patent
Sato

(10) Patent No.: US 7,194,592 B2
(45) Date of Patent: Mar. 20, 2007

(54) STORAGE SYSTEM USING LOAD BALANCING AMONG SYSTEMS OF VARYING PERFORMANCE

(75) Inventor: Eiichi Sato, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 12 days.

(21) Appl. No.: 10/853,411

(22) Filed: May 26, 2004

(65) Prior Publication Data

US 2005/0216591 A1 Sep. 29, 2005

(30) Foreign Application Priority Data

Mar. 26, 2004 (JP) ............................ 2004-091064

(51) Int. Cl.
*G06F 12/02* (2006.01)
(52) U.S. Cl. .................... 711/165; 711/158; 709/224
(58) Field of Classification Search ............... 711/165, 711/158; 709/224
See application file for complete search history.

(56) References Cited

U.S. PATENT DOCUMENTS

| 5,915,264 | A | 6/1999 | White et al. |
| 6,209,070 | B1 | 3/2001 | Reed et al. |
| 6,681,303 | B1 | 1/2004 | Watanabe et al. |
| 2002/0091828 | A1 | 7/2002 | Kitamura et al. |
| 2003/0065898 | A1* | 4/2003 | Flamma et al. ............. 711/165 |
| 2003/0093439 | A1* | 5/2003 | Mogi et al. ................. 707/200 |
| 2003/0093442 | A1* | 5/2003 | Mogi et al. ................. 707/203 |
| 2003/0093619 | A1 | 5/2003 | Sugino et al. |
| 2003/0131207 | A1 | 7/2003 | Arakawa et al. |
| 2003/0196037 | A1 | 10/2003 | Obara et al. |
| 2003/0221063 | A1 | 11/2003 | Eguchi et al. |
| 2004/0107315 | A1 | 6/2004 | Watanabe et al. |
| 2004/0186899 | A1 | 9/2004 | Hiraiwa et al. |
| 2004/0193658 | A1 | 9/2004 | Kawamura et al. |
| 2004/0193797 | A1 | 9/2004 | Krehbiel, Jr. et al. |
| 2004/0199526 | A1 | 10/2004 | Nishikawa et al. |

FOREIGN PATENT DOCUMENTS

JP 2003-216460 7/2003

* cited by examiner

*Primary Examiner*—Brian R. Peugh
*Assistant Examiner*—Jared Rutz
(74) *Attorney, Agent, or Firm*—Mattingly, Stanger, Malur & Brundidge, P.C.

(57) ABSTRACT

According to this invention, in an environment in which are intermixed a plurality of storage subsystems with different processing performance, volumes are automatically relocated according to the state of use of each storage subsystem. A storage system comprises a plurality of storage subsystems 1, 2 with different processing performance. When unevenness occurs in the states of use of the storage subsystems 1, 2, and movement of a volume 2A becomes necessary, a management server 3 issues an instruction for volume movement to the copy source system 2 and to the copy target system 1 (S1). The management server 3 notifies a service-providing server 4 of the volume movement (S2). At the copy source, the volume 2A is allocated to a dummy volume 2B (S3), and at the copy target, an unused volume 1C is allocated to a dummy volume 1B (S4). Then volume copying is executed, and the volume is moved between the storage subsystems 1, 2.

2 Claims, 12 Drawing Sheets

| SERVER MANAGEMENT INFORMATION ||||||
|---|---|---|---|---|---|
| SERVER ID | FILE SYSTEM | VIRTUAL VOLUME | INITIAL UNIQUE ID | STORAGE ID | VOLUME ADDRESS |
| Server1 | FS1 | V1 | 1 | Storage1 | A1 |
| | | V2 | 2 | | A2 |
| | | V3 | 3 | | A3 |
| | FS2 | V4 | 300 | Storage3 | C1 |
| | | V5 | 301 | | C2 |
| Server2 | FS1 | V1 | 200 | Storage2 | B1 |
| | | V2 | 201 | | B2 |
| | FS2 | V3 | 4 | Storage1 | A4 |
| | | V4 | 5 | | A5 |
| | | V5 | 6 | | A6 |
| | | V6 | 7 | | A7 |
| | FS3 | V7 | 302 | Storage3 | C3 |
| | | V8 | 303 | | C4 |

| STORAGE MANAGEMENT INFORMATION ||||
|---|---|---|---|
| STORAGE ID | VOLUME ADDRESS | STATUS | INITIAL UNIQUE ID |
| Storage1 | A1 | IN USE | 1 |
| | A2 | IN USE | 2 |
| | ⋮ | ⋮ | ⋮ |
| | A50 | RESERVED POOL | - |
| | ⋮ | ⋮ | ⋮ |
| | A100 | UNUSED | - |
| | ⋮ | ⋮ | ⋮ |
| Storage2 | B1 | IN USE | 200 |
| | B2 | IN USE | 201 |
| | ⋮ | ⋮ | ⋮ |
| | B20 | RESERVED POOL | - |
| | ⋮ | ⋮ | ⋮ |
| | B50 | UNUSED | - |
| | ⋮ | ⋮ | ⋮ |
| Storage3 | C1 | IN USE | 300 |
| | C2 | IN USE | 301 |
| | ⋮ | ⋮ | ⋮ |
| | C30 | RESERVED POOL | - |
| | ⋮ | ⋮ | ⋮ |
| | C80 | UNUSED | - |
| | ⋮ | ⋮ | ⋮ |

| VOLUME TRANSITION CONDITION SETTING INFORMATION | | | | |
|---|---|---|---|---|
| COPY SOURCE STORAGE ID | COPY TARGET STORAGE ID | COPY MANAGEMENT UNIT | CONDITION | STATISTICAL INFORMATION COLLECTION INTERVAL |
| Storage2 | Storage1 | FILE SYSTEM | USE RATE X 1% EXCEEDED | 1 |
| Storage1 | Storage2 | FILE SYSTEM | USE RATE Y 1% NOT MET | |
| Storage3 | Storage1 | UNIT VOLUME | USE RATE X 2% EXCEEDED | |
| Storage1 | Storage3 | UNIT VOLUME | USE RATE Y 2% NOT MET | |

STORAGE SYSTEM USING LOAD BALANCING AMONG SYSTEMS OF VARYING PERFORMANCE

CROSS-REFERENCE TO RELATED APPLICATIONS

This application relates to and claims priority from Japanese Patent Application No. 2004-091064 filed on Mar. 26, 2004, the entire disclosure of which is incorporated herein by reference.

BACKGROUND OF THE INVENTION

1. Field of the Invention

This invention relates to a storage system comprising a plurality of different types of storage subsystems with different processing performance.

2. Description of the Related Art

A storage system is configured with for example disk drives arranged in an array, and provides a storage area based on a RAID (Redundant Array of Independent Inexpensive Disks). A logical volume (logical device), which is a logical storage area, is formed in the physical storage areas of each disk drive. A host computer (server) can read and write the desired data by issuing a write command or read command in a prescribed format to the storage system.

However, the performance of disk drives continues to improve each year, and storage subsystems are used over extended periods of time. Hence there are cases in which high-speed disk drives and low-speed disk drives coexist within the same storage subsystem. Consequently in order to make effective use of disk drives, so-called data migration techniques, in which frequently-used data is moved to high-speed disk drives and infrequently-used data is moved to low-speed disk drives, have been proposed (Japanese Patent Laid-open No. 2003-216460).

In the technology of the prior art, high-speed disk drives and low-speed disk drives are intermixed in the same storage system, and data is relocated according to frequency of data use. However, in conventional technology data cannot be relocated spanning different types of storage subsystems. Moreover, in conventional technology it is possible to copy the contents of volumes spanning storage subsystems, but this is merely performed for purposes of so-called disaster recovery, and optimal location of volumes according to the state of use of each storage subsystem is not possible.

With advances in computer and network technology, there have been steady improvements in the performance of storage subsystems. Further, the quantity of data to be managed by enterprises, municipalities, schools and other organizations increases each year, and while there is always a desire for storage systems with enhanced performance, storage subsystems are expensive system products.

Hence systems may be constructed in which, for example, while an old-type storage system continues operation a higher-performance storage system is newly introduced, and the new and old storage systems are operated in concert. And, storage systems may be constructed in which mid-scale storage subsystems are positioned in different departments, with a large-scale storage subsystem installed in a computer room linked with mid-scale storage subsystems.

In this way, there are cases in which storage subsystems with different processing performance are connected and operated together. However, conventional technology does not take into consideration the relocation of volumes in an environment in which different storage subsystems coexist, so that automatic relocation of volumes according to the state of use is not possible even when there is uneven use among storage subsystems; consequently such systems cannot be used efficiently.

For example, after the initial construction of a system, there are cases in which the frequency of use of a storage subsystem with relatively poor performance is greater than the frequency of use of a high-performance storage subsystem. And, there are cases in which the frequency of use of a volume placed in a high-performance storage subsystem declines, so that the storage resources of the high-performance storage subsystem are wasted.

Thus when unevenness in the use of storage subsystems occurs in a heterogeneous environment in which different types of storage subsystems coexist, a system administrator studies the relocation of volumes. When relocating volumes, the system administrator must perform volume copying of a volume to be moved to another storage subsystem, cause the relocated volume to be recognized again by the server, and confirm operation. Hence the tasks involved are complex, and the storage system is difficult to use.

SUMMARY OF THE INVENTION

An object of this invention is the provision of a storage system capable of relocation of volumes according to the state of use of storage subsystems with different processing performance. An object of this invention is the provision of a storage system enabling the easy ascertainment of each volume, even when volumes are relocated in an environment in which different types of storage subsystems coexist. An object of this invention is the provision of a storage system capable of relocation of volumes in a shorter amount of time, in an environment in which different types of storage subsystems coexist.

In order to resolve the above problems, a storage system according to this invention comprises a plurality of storage subsystems of types with different processing performance, and each of which provides one or more volumes; a service-providing server which accesses each of the storage subsystems and exchanges data; a management server, connected to each storage subsystem and to the service-providing server, to manage each storage subsystem; a collection/analysis portion which collects and analyzes information relating to the state of use of each storage subsystem; and a volume transition management portion which, based on the analyzed state of use, moves volumes with relatively high frequencies of use to storage subsystems with relatively high processing performance among the storage subsystems, and moves volumes with relatively low frequencies of use to storage subsystems with relatively low processing performance among the storage subsystems.

The processing performance of a storage subsystem differs according to, for example cache memory capacity, disk drive performance, number of channels, communication speed, control programs, and similar. Each storage subsystem provides at least one volume. The service-providing server accesses volumes to read and write data.

The collection/analysis portion collects and analyzes information relating to the states of use of each storage subsystem. Information relating to a state of use may be, for example, information enabling the direct or indirect measurement of the frequency of use of a volume, such as the number of input/output operations per unit time. The volume transition management portion moves a volume between storage subsystems based on states of use. Volume movement is executed by performing volume copying spanning storage subsystems. A volume with a high frequency of use is moved to a storage subsystem with high processing performance, and a volume with low frequency of use is moved to a storage subsystem with low processing performance. By this means, the responsiveness of volumes with high frequencies of use is improved, and storage resources for the storage system overall can be used more efficiently.

A volume in a storage subsystem can comprise, in a unique identifying information management portion set in advance, unique identifying information which is not affected by movement of the volume by the volume transition management portion.

When volume movement is begun, the volume transition management portion notifies the service-providing server of information relating to the movement source and movement target of the volume being moved, and the service-providing server can alter the access target based on the notification from the volume transition management portion and the unique identifying information. The unique identifying information can be configured as information which enables unique identification of a volume within the storage system. The unique identifying information does not change even in cases of movement of a volume across storage subsystems. Hence after movement a volume can be identified and accessed based on the unique identifying information.

Prior to the beginning of volume movement by the volume transition management portion, a communication path for volume movement between storage subsystems can be set provisionally. By provisionally setting a communication path, the trouble involved in establishing a communication session upon execution of volume copying can be eliminated, and volumes can be moved more quickly.

A pool area to secure in advance unused volumes for use in volume movement by the volume transition management portion can also be comprised. Volume movement is realized by volume copying. By securing in advance an unused volume for use in volume copying, the occurrence of shortages of unused volumes, with a consequent effect on volume movement, can be prevented in advance.

Other objects of this invention will become clear in the following descriptions of an aspect of the invention.

BRIEF DESCRIPTION OF THE DRAWINGS

FIG. 6 is an explanatory drawing showing the configuration of server management information;

FIG. 7 is an explanatory drawing showing the configuration of storage management information;

FIG. 8 is an explanatory drawing showing the configuration of volume transition condition setting information;

DESCRIPTION OF THE PREFERRED EMBODIMENTS

Below, an aspect of this invention is explained based on the drawings. In the aspect, a storage system is disclosed comprising a plurality of storage subsystems with different processing performance, a service-providing server which accesses and exchanges data with the storage subsystems, and a management server connected with each of the storage subsystems and with the service-providing server and which manages the storage subsystem.

The management server comprises a collection/analysis portion, which collects information relating to states of use of storage subsystems; a volume transition management portion, which based on analyzed states of use moves volumes with relatively high frequencies of use to storage subsystems with relatively high processing performance among the storage subsystems and moves volumes with relatively low frequencies of use to storage subsystems with relatively low processing performance among the storage subsystems; and a unique identifying information management portion, which sets in advance for the volumes of each storage subsystem unique identifying information which is not affected by volume movement by the volume transition management portion.

Each storage subsystem comprises at least one actual volume; a dummy volume for movement control, prepared according to the number of movement paths; an unused volume, secured in advance in a pool area; a copy control portion which performs volume copying spanning storage subsystems, based on instructions from the volume transition management portion; and an investigation portion, which collects information relating to states of use and transmits the information to the collection/analysis portion.

The service-providing server comprises a volume movement monitoring portion which receives notifications relating to volume movement from the volume transition management portion, and an access target modification portion which modifies the access target to a volume moved by volume movement, based on notifications and unique identifying information.

In the movement-source storage subsystem, a volume to be moved is allocated to the dummy volume for movement control, and in the movement-target storage subsystem, an unused volume is allocated to the dummy volume for movement control; the contents of the volume to be moved allocated to the dummy volume for movement control are then volume-copied to the unused volume allocated to the dummy volume for movement control, and when volume copy is completed, use of the volume-copied volume is begun, and the volume which has been moved is returned to the pool area as an unused volume.

Figure 1:
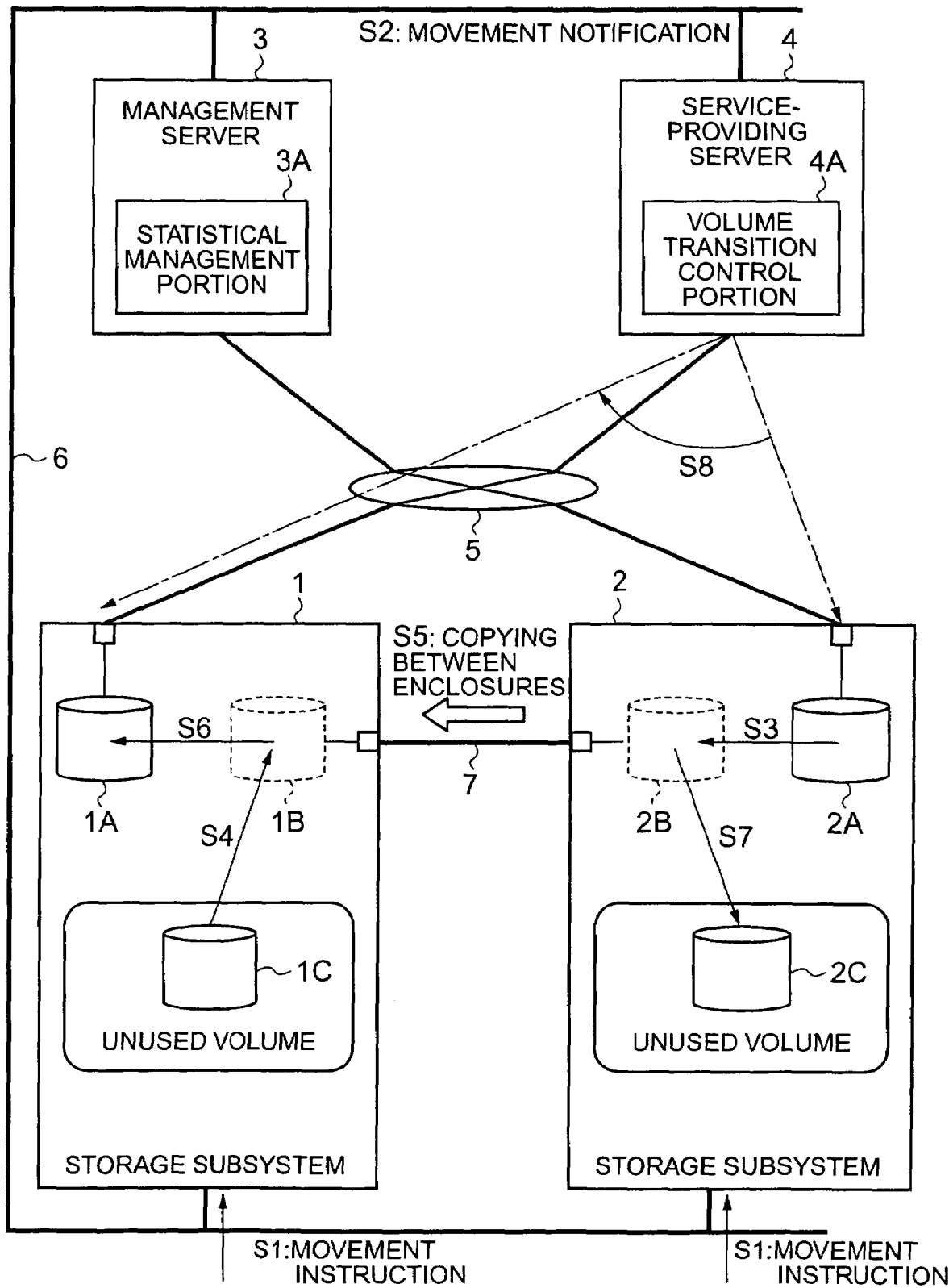
FIG. 1 is an explanatory drawing illustrating the concept of an aspect of this invention.

FIG. 1 is an explanatory drawing illustrating the overall concept of this aspect. The storage system comprises a plurality of storage subsystems 1, 2, the management server 3, and the service-providing server 4. These storage subsystems 1, 2, the management server 3, and the service-providing server 4 are interconnected by for example a SAN (Storage Area Network) or other communication network 5. Also, the storage subsystems 1, 2, management server 3 and service-providing server 4 are interconnected by for example a LAN (Local Area Network) or other communication network 6.

The communication network 5 is for example used to transfer data in block units, and the communication network 6 is for example used to transfer management information such as volume-copy instructions. The storage subsystems 1, 2 are directly connected by for example a SAN or other communication network 7. This communication network 7 is for example used for volume copying spanning enclosures.

The processing performance of the storage subsystems 1 and 2 is different, as for example in the case of a new storage subsystem and an old storage subsystem provided by the same vendor.

The storage subsystem 1 has an actual volume 1A, a dummy volume 1B, and an unused volume (unassigned volume) 1C. The other storage subsystem 2 also has an actual volume 2A, a dummy volume 2B, and an unused volume 2C. The actual volumes 1A, 2A are volumes which can actually be accessed by the service-providing server 4. The dummy volumes 1B, 2B are virtual entities for use in provisionally setting communication paths for volume copying. The dummy volumes 1B, 2B are allocated in advance to ports of the communication network 7 for volume copying, and a session is established and maintained at the communication interface between the dummy volumes 1B, 2B. The unused volumes 1C, 2C are volumes reserved for volume copying among the unused volumes of the storage subsystems 1, 2.

The management server 3 is used for volume configuration in the storage subsystems 1, 2 and similar. The management server 3 comprises a statistical management portion 3A. The statistical management portion 3A ascertains the states of use of the storage subsystems 1, 2, and outputs instructions for volume movement according to the states of use.

The service-providing server 4 comprises a volume transition control portion 4A. The volume transition control portion 4A receives notifications from the statistical management portion 3A, and when an access target volume is moved, switches access to the storage subsystem which is the movement target.

An explanation is given for an example in which a volume is moved from storage subsystem 2 to storage subsystem 1. It is assumed that storage subsystem 1 is a high-performance system, and that storage subsystem 2 is a low-performance system. A volume with high frequency of use is moved to the high-performance system 1, and a volume with low frequency of use is moved to the low-performance system 2.

When the frequency of use of an actual volume 2A on storage subsystem 2 increases and exceeds a prescribed threshold, the statistical management portion 3A of the management server 3 decides on execution of volume movement. The statistical management portion 3A issues an instruction for volume movement to the movement source (copy source) system 2 and to the movement target (copy target) system 1 (S1). The statistical management portion 3A notifies the service-providing server 4 using the actual volume 2A of movement of the actual volume 2A from system 2 to system 1 (S2).

Next, in the movement source system 2, the actual volume 2A is allocated to the dummy volume 2B (S3). In the movement target system 1, the unused volume 1C is allocated to the dummy volume 1B (S4). That is, the actual volumes 2A, 1C are respectively allocated to the dummy volumes 1B, 2B.

Because a communication session is already established in the communication network 7, volume copying can be begun immediately between volume 1C of system 1 and volume 2A of system 2 (S5). During execution of volume copying, update requests from the service-providing server 4 (write commands) are halted. When a write command is received during volume copying, the differential data due to this update is managed separately, and after the completion of initial copying from volume 2A to volume 1C, the differential data is reflected in volume 1C.

When volume copying is completed, an access path is set for volume 1C, and this is used as the actual volume 1A (S6). The copy source volume 2A enters standby as the unused volume 2C (S7).

The volume transition control portion 4A of the service-providing server 4 switches access from volume 2A of system 2 to volume 1A of system 1 (S8). The above is a summary of a case in which a volume is moved from a low-performance system 2 to a high-performance system 1. Conversely, when a volume is moved from system 1 to system 2 also, processing similar to the above is performed.

In this way, a volume can be optimally relocated in the storage system according to the states of use of the storage subsystems 1 and 2, so that the responsiveness of service can be improved and storage space in the overall storage system can be utilized efficiently. Below, specific embodiments are explained. First, an example of configuration of a storage subsystem is explained based on FIG. 2 and FIG. 3, and then a method of relocation of volumes by volume-copying between enclosures is explained, referring to FIG. 4 and subsequent figures.

Figure 2:
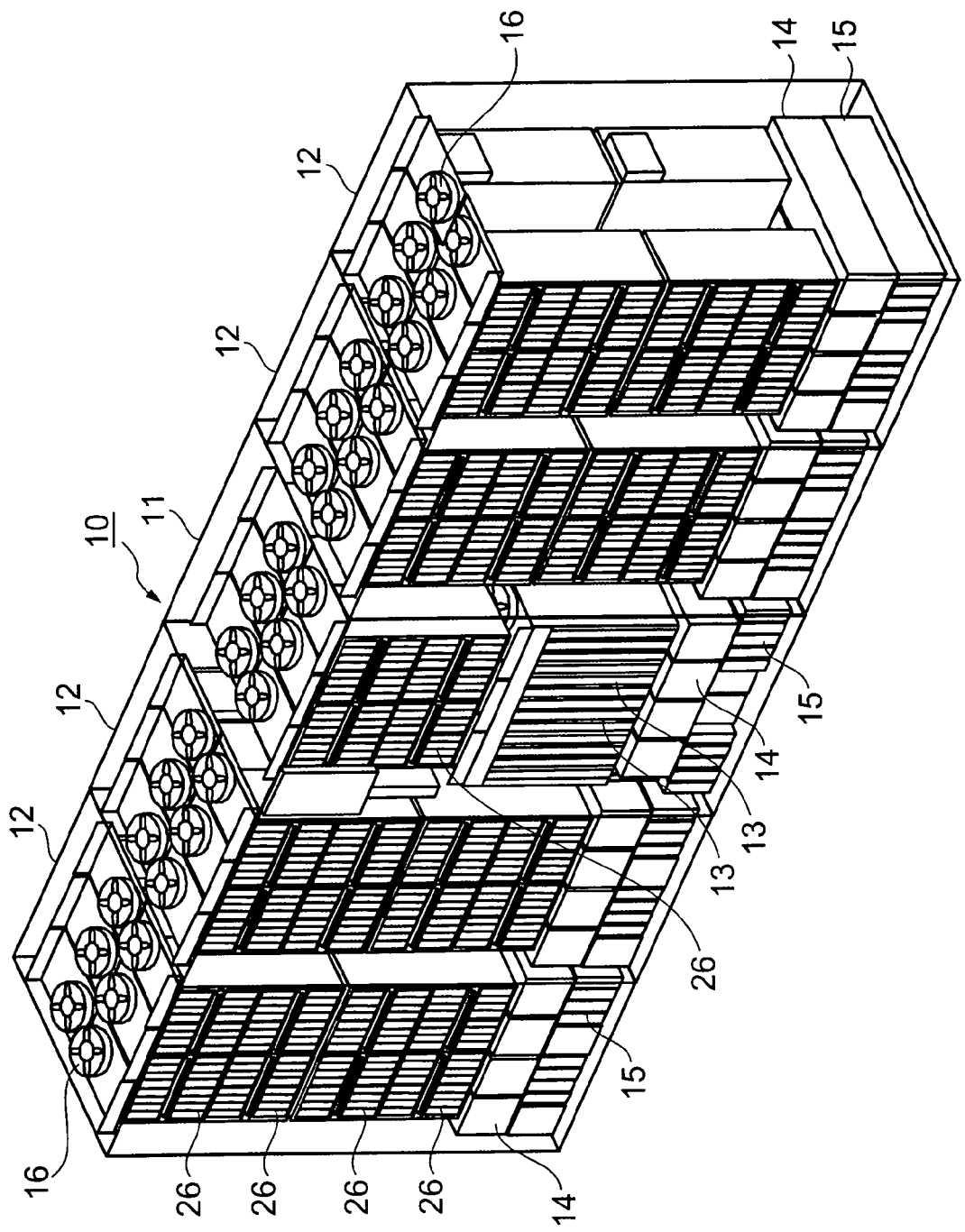
FIG. 2 is a perspective view showing an external view of a storage subsystem.

FIG. 2 is a schematic perspective view showing the external configuration of a storage subsystem 10. The storage subsystem 10 can be configured from, for example, a base enclosure 11 and a plurality of expansion enclosures 12.

The base enclosure 11 is the minimum component unit of the storage subsystem 10, and comprises both storage functions and control functions. Expansion enclosures 12 are options for the storage subsystem 10, and are controlled by the control functions of the base enclosure 11. For example, up to a maximum of four expansion enclosures 12 can be connected to a base enclosure 11.

A plurality of control packages 13, a plurality of power supply units 14, a plurality of battery units 15, and a plurality of disk drives 26 are detachably provided in the base enclosure 11. A plurality of disk drives 26, a plurality of power supply units 14, and a plurality of battery units 15 are detachably provided in expansion enclosures 12. A plurality of cooling fans 16 are also provided in the base enclosure 11 and in each expansion enclosure 12.

A control package 13 is a module for realizing a channel adapter (hereafter CHA) 21, disk adapter (hereafter DKA) 22, and cache memory 23 and similar, described below. That is, a plurality of CHA packages, a plurality of DKA packages, and one or more memory packages are detachably provided in a base enclosure 11, and can be exchanged in package units.

Figure 3:
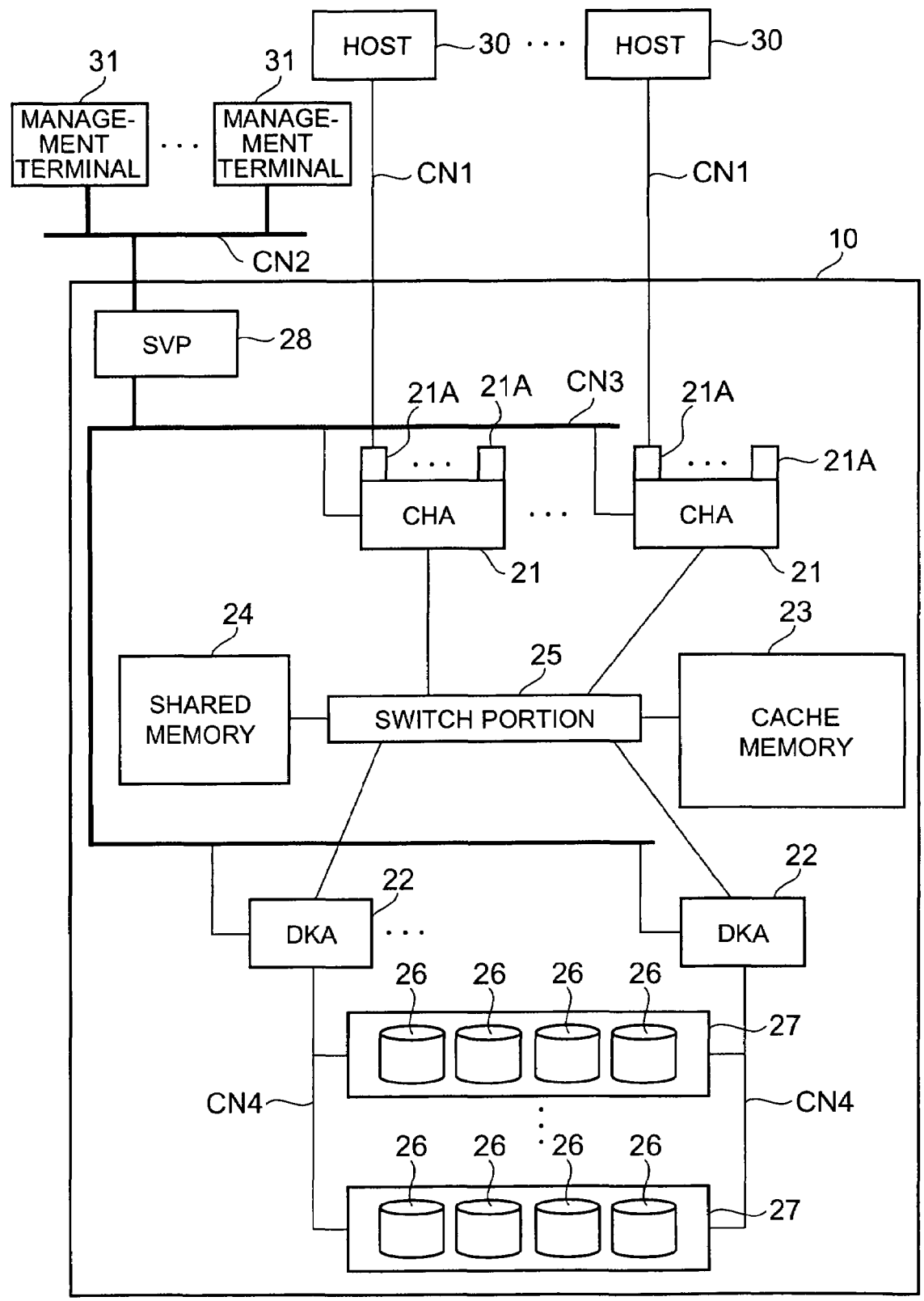
FIG. 3 is a functional block diagram of a storage subsystem.

FIG. 3 is a block diagram showing schematically the entirety of a storage subsystem 10. The storage subsystem 10 can be connected, in a manner enabling bidirectional communication, to a plurality of host computers 30 via a communication network CN1.

The communication network CN1 is, for example, a LAN, SAN, the Internet, or dedicated circuits. In the case of a LAN, data transfers between a host computer 30 and the storage subsystem 10 conform to TCP/IP. When using a SAN, data transfers between a host computer 30 and the storage subsystem 10 conform to the fiber channel protocol. When the host computer 30 is a mainframe, data transfers are performed conforming to for example FICON (Fibre Connection, a registered trademark), ESCON (Enterprise System Connection, a registered trademark), ACONARC (Advanced Connection Architecture, a registered trademark), FIBARC (Fibre Connection Architecture, a registered trademark), or another communication protocol.

Each host computer 30 is realized as, for example, a server, personal computer, workstation, mainframe, or similar. For example, each host computer 30 is connected to a plurality of client terminals, positioned outside the drawing, via a separate communication network. Each host computer 30 provides services to the client terminals by reading data from and writing data to the storage subsystem 10 according to requests from the client terminals.

Each CHA 21 controls data transfer with a host computer 30, and comprises communication ports 21A. For example, 32 CHAs 21 can be provided in a storage subsystem 10. CHAs 21 are prepared according to the type of host computer 30, including for example open-system CHAs, mainframe CHAs, and similar.

Each CHA 21 receives commands and data requesting the reading and writing of data from the host computer 30 to which the CHA is connected, and operates according to commands received from the host computer 30.

To explain operation including operation of DKAs 22, when a CHA 21 receives a read command from the host computer 30, the read command is stored in shared memory 24. The DKA 22 references the shared memory as necessary, and upon discovering an unprocessed read command, reads data from a disk drive 26 and stores the data in cache memory 23. The CHA 21 reads the data which has been moved to cache memory 23, and transmits the data to the host computer 30.

On the other hand, upon receiving a write command from the host computer 30, the CHA 21 stores the write command in shared memory 24. Also, the CHA 21 stores the received data (user data) in cache memory 23. After storing the data in cache memory 23, the CHA 21 reports to the host computer 30 that writing has been completed. The DKA 22 reads the data stored in cache memory 23 and stores the data in a prescribed disk drive 26, according to the write command stored in shared memory 24.

A plurality of DKAs 22, such as for example four or eight, can be provided within the storage subsystem 10. Each DKA 22 controls data communications with the disk drives 26. DKAs 22 and disk drives 26 are connected via for example a SAN or other communication network CN4, to perform data transfer in block units according to the fiber channel protocol. Each DKA 22 monitors the states of disk drives 26 as necessary, and the monitoring results are transmitted to the SVP 28 via the internal network CN3.

Each CHA 21 and DKA 22 comprises, for example, a printed circuit board on which are mounted processors, memory and similar, as well as a control program stored in memory (none of these appear in the drawing); through the concerted operation of this hardware and software, each realizes prescribed functions.

The cache memory 23 stores, for example, user data and similar. The cache memory 23 comprises, for example, nonvolatile memory.

The shared memory (or control memory) 24 comprises, for example, nonvolatile memory. Control information, management information and similar are for example stored in shared memory 24. This control information and similar can be managed redundantly in a plurality of units of shared memory 24. The shared memory 24 and cache memory 23 can each be provided in a plurality of units. Further, cache memory 23 and shared memory 24 can be mounted together on the same memory board. Or, a portion of a memory unit can be used as a cache area, and another portion as a control area.

The switch portion 25 connects the CHAs 21, the DKAs 22, cache memory 23, and shared memory 24. By this means, each of the CHAs 21 and DKAs 22 can access cache memory 23 and shared memory 24. The switch portion 25 can be configured, for example, as an ultra-high speed crossbar switch.

A multiplicity of disk drives 26 can be installed in the storage subsystem 10. Each disk drive 26 can for example be realized as a hard disk drive (HDD), as a semiconductor memory device, or similar.

Disk drives 26 are physical storage devices. While there are differences depending on the RAID configuration, for example, a RAID group 27, which is a virtual logical area, may be constructed in the physical storage area provided by a set of four disk drives 26. Further, one or more virtual logical devices (LUs, logical units) can be configured in a RAID group 27.

The storage resources used by a storage subsystem 10 need not all be provided within the storage subsystem 10. The storage subsystem 10 can also use storage resources existing outside the storage subsystem 10 as if they were storage resources of the storage subsystem itself.

The service processor (SVP) 28 is connected to each of the CHAs 21 and DKAs 22 via a LAN or other internal network CN3. Further, the SVP 28 can also be connected to a plurality of management terminals 31 via a LAN or other communication network CN2. The SVP 28 collects information on various states within the storage subsystem 10 and provides these to management terminals 31.

Figure 4:
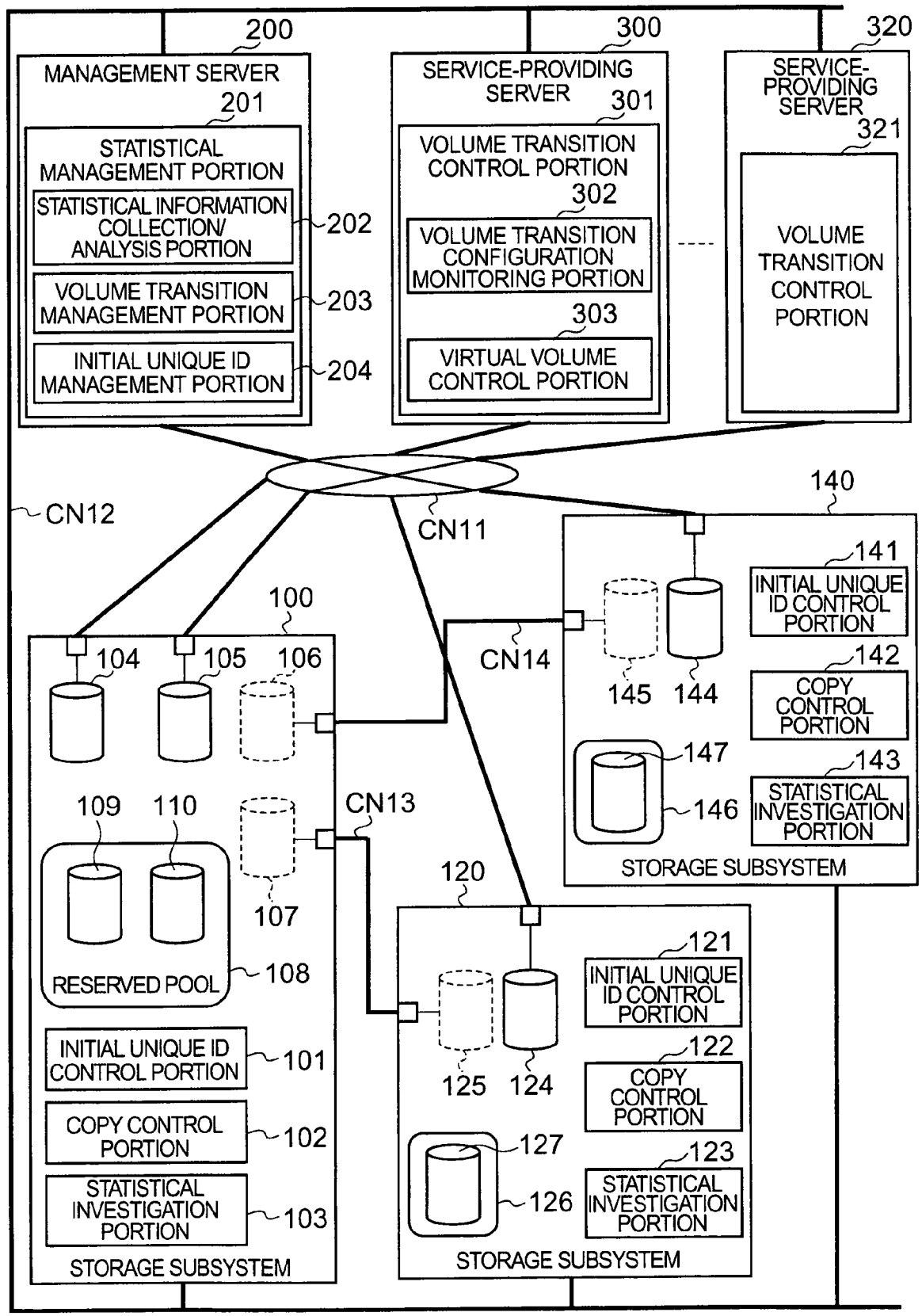
FIG. 4 is a block diagram showing the overall configuration of a storage system.

FIG. 4 is a block diagram showing the overall configuration of a storage system. This storage system comprises a plurality of storage subsystems 100, 120, 140 with different processing performance, a management server 200, and a plurality of service-providing servers 300, 320.

The storage subsystems 100, 120, 140 can be configured as explained in conjunction with FIG. 2 and FIG. 3. In this embodiment, for example, the storage subsystem 100 is taken to be a large-scale system, and the storage subsystems 120, 140 are mid-scale systems. The storage subsystem 100 has higher processing performance compared with the other storage subsystems 120, 140.

The storage subsystems 100, 120, 140, the management server 200, and each of the service-providing servers 300, 320 are interconnected by for example a SAN or other communication network CN11. The storage subsystems 100, 120, 140, management server 200 and service-providing servers 300, 320 are also interconnected by for example a LAN or other communication network CN12. Further, the storage subsystem 100 and storage subsystem 120 are directly connected by for example a SAN or other communication network CN13. Similarly, the storage subsystem 100 and storage subsystem 140 are directly connected by for example a SAN or other communication network CN14.

Here, the communication network CN11 is for example used to transfer user data and similar between the service-providing server 300, 320 and the storage subsystems 100, 120, 140. The communication network CN12 is for example used for communication of management and other information between the management server 200 and the storage subsystem 100, 120, 140, and between the management server 200 and the service-providing servers 300, 320. The communication network CN13 is used for volume copying between the storage subsystem 100 and storage subsystem 120. The communication network CN14 is used for volume copying between the storage subsystem 100 and storage subsystem 140. As explained below, communication sessions are established in advance on the communication networks CN13 and CN14 by dummy volumes.

The storage subsystem 100 comprises an initial unique ID control portion 101, copy control portion 102, and statistical investigation portion 103. The initial unique ID control portion 101 allocates identification information (an initial unique ID) to uniquely identify and manage all the actual volumes existing in the storage system. That is, the initial unique ID control portion 101 associates an initial unique ID allocated by the management server 200 with all the actual volumes 104, 105 within the storage subsystem 100. An initial unique ID is information which uniquely identifies a volume in a storage system, and is information which is passed on when a volume is moved. The copy control portion 102 provides control of volume copying spanning enclosures. The statistical investigation portion 103 collects information relating to the state of use of the storage subsystem 100, and transmits this information to the management server 200. Information relating to the state of use can include for example the frequencies of use of the actual volumes 104, 105 within the storage subsystem 100.

The storage subsystem 100 comprises volumes (also called actual volumes) 104 and 105 which can be accessed by the service-providing servers 300, 320, dummy volumes 106 and 107, and unused volumes 109 and 110 which are secured in a reserved pool (reserved volumes pool) area 108.

Data groups used by the service-providing servers 300, 320 are stored in the actual volumes 104, 105. The dummy volume 106 is used to establish a communication path between the storage subsystem 100 and the storage subsystem 140. Similarly, the dummy volume 107 is used to establish a communication path between the storage subsystem 100 and the storage subsystem 120. The dummy volumes 106, 107 are virtual entities.

That is, the dummy volumes are provided according to the number of paths for volume copying spanning enclosures which is executed. Or, dummy volumes are provided in a number according to the number of paths for movement of volumes between the storage subsystems 100, 120, 140. In this embodiment, volumes are not moved between the storage subsystems 120 and 140, which are configured as mid-scale systems. Hence a communication network and dummy volume for use in directly connecting the storage subsystems 120 and 140 are not provided.

The reserved pool area 108 is an area for securing in advance unused volumes 109. 110 for use in volume copying. Among the unused volume group comprised by the storage subsystem 100, the unused volumes 109, 110 used for volume copying are registered in advanced in the reserved pool area 108. A plurality of unused volumes 109, 110 are registered in the reserved pool area 108 such that at least one unused volume can be allocated to each copy path (path for volume movement). In the drawing, the storage subsystem 100 secures two unused volumes 109, 110, in order to enable volume copying with the storage subsystem 120 and with the storage subsystem 140.

The other storage subsystems 120, 140 are configured similarly to the storage subsystem 100. The storage subsystem 120 comprises an initial unique ID control portion 121, a copy control portion 122, a statistical investigation portion 123, an actual volume 124, a dummy volume 125, and an unused volume 127 secured in the reserved pool area 126. The storage subsystem 140 comprises an initial unique ID control portion 141, a copy control portion 142, a statistical investigation portion 143, an actual volume 144, a dummy volume 145, and an unused volume 147 secured in the reserved pool area 146. The configuration and functions of these portions are similar to those described in the storage subsystem 100, and so explanations are omitted.

The management server 200 comprises a statistical management portion 201. A statistical information collection/analysis portion (hereafter "collection/analysis portion") 202, volume transition management portion 203, and initial unique ID management portion 204 can be provided in the statistical management portion 201.

The collection/analysis portion 202 collects information relating to the states of use of each storage subsystem from the statistical investigation portions 103, 123, 143 of the storage subsystems 100, 120, 140, and analyzes the information. Analyses may comprise for example determine of whether the states of use of each actual volume exceed a prescribed threshold (upward threshold), or are less than another prescribed threshold (downward threshold). Here, the upward threshold is a value used when causing a volume to be moved from a mid-scale storage subsystem 120, 140 to the large-scale storage subsystem 100. The downward threshold is a value used when causing a volume to be moved from the large-scale storage subsystem 100 to one of the mid-scale storage subsystems 120, 140.

The volume transition management portion 203 manages volume movement between the storage subsystems 100, 120, 140. The volume transition management portion 203 judges the necessity for volume movement based on the frequencies of use of each volume. When volume movement is judged to be necessary, the volume transition management portion 203 issues an instruction for execution of volume copying to the movement source (copy source) storage subsystem and to the movement target (copy target) storage subsystem. Further, the volume transition management portion 203 sends information relating to the volume movement to the service-providing servers 300, 320 using the volume to be moved. Information relating to volume movement may be, for example, the movement source storage subsystem name, movement target storage subsystem name, and initial unique ID of the volume to be moved.

The initial unique ID management portion 204 allocates, to each of the storage subsystems 100, 120 and 140, initial unique IDs which uniquely within the storage system identify all the actual volumes in the storage system.

The service-providing server 300 comprises a volume transition control portion 301. A volume transition configuration monitoring portion (hereafter "monitoring portion") 302 and virtual volume control portion 303 can for example be provided in the volume transition control portion 301. The monitoring portion 302 receives notifications relating to volume movement from the volume transition management portion 203. The virtual volume control portion 303 is provided in order to prevent contradictions in recognition of the volume by the server accompanying the volume movement.

Figure 5:
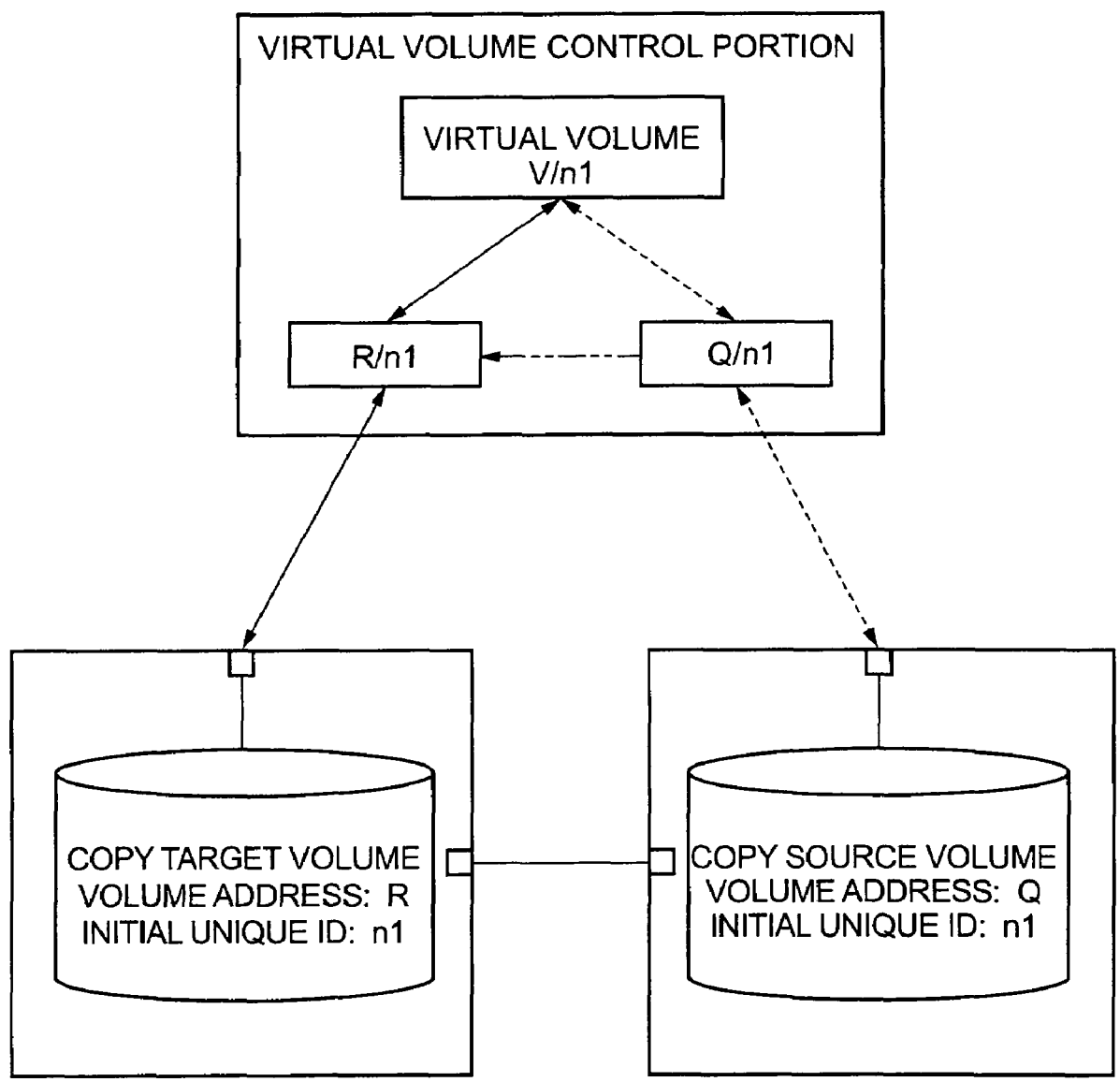
FIG. 5 is an explanatory drawing which schematically shows the method of controlling the volume accessed by a virtual volume.

Functions of the virtual volume control portion 303 are shown in FIG. 5. The virtual volume control portion 303 allocates a virtual volume V to the file system of the service-providing server 300. The virtual volume V is associated with an actual volume having a volume address "Q" and initial unique ID "n1". Hence the file system of the service-providing server 300 accesses an actual volume (Q,n1) via the virtual volume V. The virtual volume control portion 303 manages the information of the actual volume (Q,n1) associated with the virtual volume V.

The volume (Q,n1) is moved to the storage subsystem of the copy target through execution of volume copying. The volume address is identification information, such as for example the volume number or similar, used within the storage subsystem. Hence the volume address changes from "Q" to "R". However, the initial unique ID "n1" is inherited by the copy target from the copy source, and does not change as a result of volume copying. Therefore the virtual volume control portion 303 can accurately ascertain volume movement based on the initial unique ID of a volume at the movement target received from the volume transition management portion 203. The virtual volume control portion 303 associates the volume (R,n1) after movement with the virtual volume "V".

In this way, modification of the access target accompanying volume movement is executed by the virtual volume control portion 303. The file system of the service-providing server 300 accesses a common virtual volume V before and after volume copying. Hence even when a volume is moved through volume copying, the file system of the service-providing server 300 is not aware of the volume movement.

Returning to FIG. 4, similarly to the service-providing server 300, the other service-providing server 320 also comprises a volume transition control portion 321. The volume transition control portion 321 performs processing similar to that of the volume transition control portion 301, and so an explanation is omitted.

FIG. 6 is an explanatory drawing showing schematically server management information T1. Server management information T1 is information for management of the service-providing servers 300, 320, and is for example stored in the management server 200.

In server management information T1, for example, server IDs allocated to each service-providing server, information to identify the file system of each service-providing server, virtual volume numbers used by each file system, initial unique IDs of actual volumes assigned to each virtual volume, storage IDs for identification of storage subsystems to which actual volumes belong, and volume addresses of actual volumes, are stored in association. By means of this server management information T1, it is possible to ascertain the storage subsystem of an actual volume being used by a file system of a service-providing server via a virtual volume.

FIG. 7 is an explanatory drawing showing schematically storage management information T2. Storage management information T2 is information used to manage the configurations of the storage subsystems 100, 120, 140 within the storage system, and is stored for example in the management server 200.

In storage management information T2, for example, storage IDs to identify storage subsystems, volume addresses of a plurality of volumes held by a storage subsystem, the status of these volumes, and initial unique IDs allocated to each volume in use (assigned), are associated. In the storage management information T2 actual volumes are managed, whereas dummy volumes, which are virtual entities, are not managed.

The status of each volume may be, for example, "in use", "reserved pool", and "unused (unassigned)". The "in use" status indicates a state in which the volume is being used by a service-providing server. An initial unique ID is allocated only to volumes with the "in use" status. The "reserved pool" status means that the volume is in a state of being secured in the reserved pool area. The "unused" status indicates that the volume is not being used.

FIG. 8 is an explanatory drawing showing schematically volume transition condition setting information. The volume transition condition setting information T3 is information used to set transition conditions for movement of volumes between the storage subsystems 100, 120, 140. The volume transition condition setting information T3 is stored for example in the management server 200.

In the volume transition condition setting information T3, for example, a storage ID used to identify the copy source storage subsystem, a storage ID used to identify the copy target storage subsystem, the copy management units, transition conditions, and interval for collection of statistical information, are associated. As the copy management units, an exclusive choice of one among a file system unit and volume unit can be selected. When a file system unit is selected, all the volumes used by the file system are grouped, and are moved across enclosures by volume copying. When a volume unit is selected, only the volume is moved across enclosures by volume copying.

Two types of transition conditions can be set. One is an upward transition condition, and the other is a downward transition condition. An upward transition condition is a condition for cases in which a volume is moved from a storage subsystem with relatively low processing performance to a storage subsystem with relatively high processing performance. For example, when the rate of use of a volume "exceeds X1%", the volume is moved. A downward-direction transition condition is a condition for cases in which a volume is moved from a storage subsystem with relatively high processing performance to a storage subsystem with relatively low processing performance. For example, when the rate of use of the volume "is less than Y1%", the volume is moved.

The interval between statistical information collection is information stipulating the intervals in which statistical information (states of use of storage subsystems) is collected from each of the storage subsystems 100, 120, 140. In the example shown in the drawing, statistical information is collected at the same intervals from all the storage subsystems. However, even when the intervals between statistical information collection are the same, the timing for transmission of statistical information from the storage subsystems 100, 120, 140 to the management server 200 may be different. Moreover, a configuration may also be employed in which statistical information is collected at different periods in each of the storage subsystems 100, 120, 140.

Figure 9:
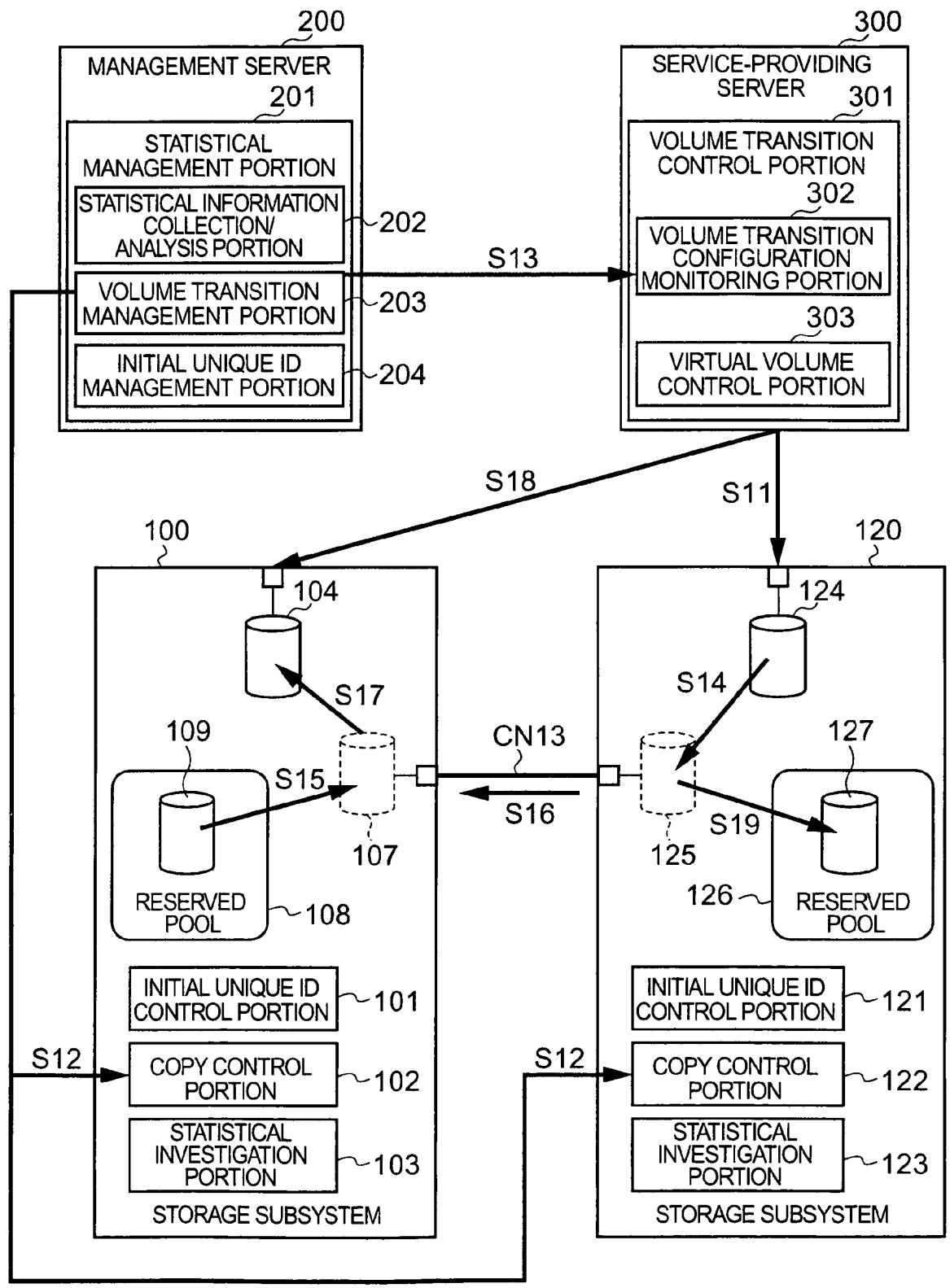
FIG. 9 is an explanatory drawing showing the flow of a volume transition.
Figure 10:
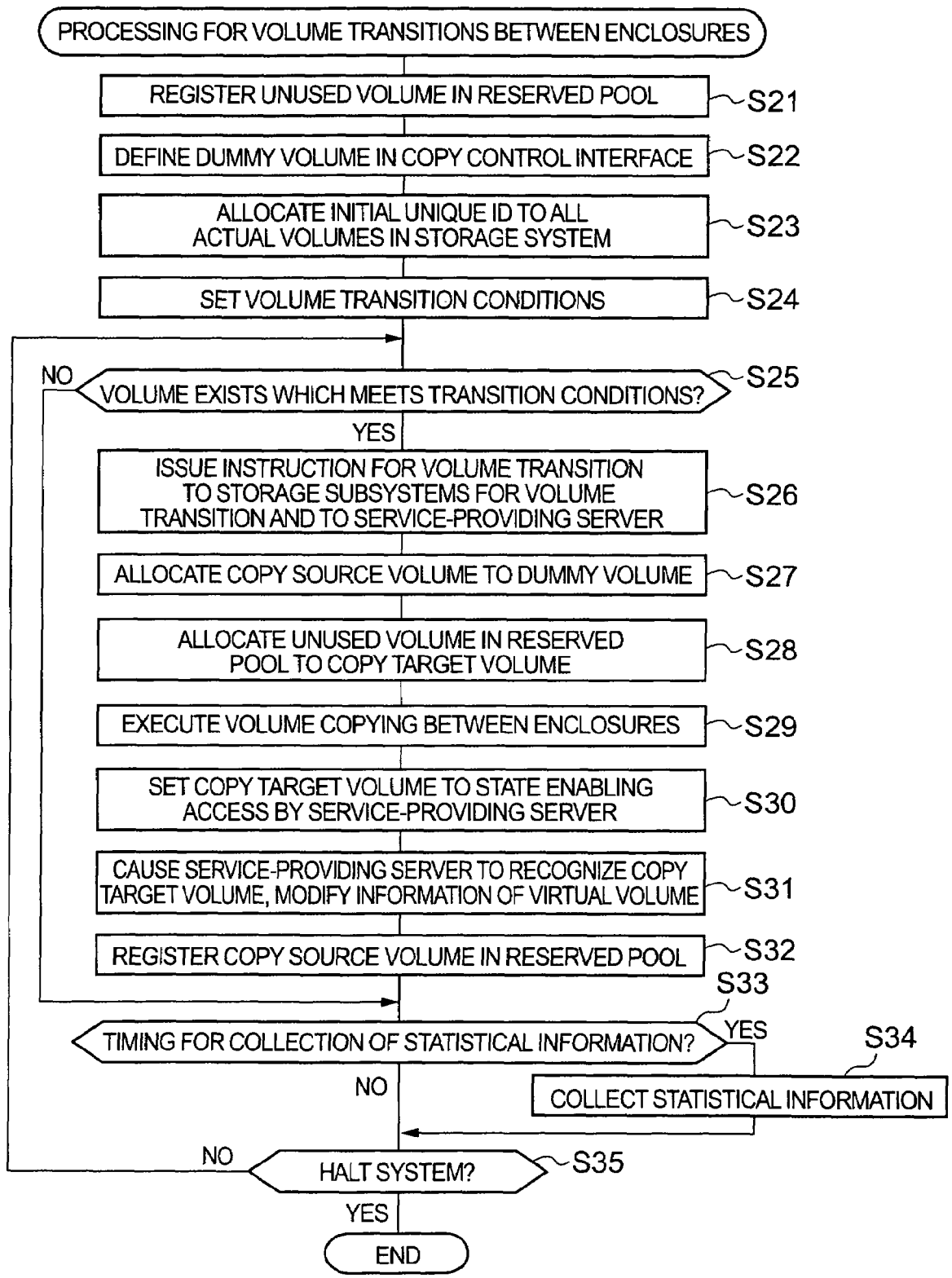
FIG. 10 is a flowchart showing volume transition processing.
Figure 11:
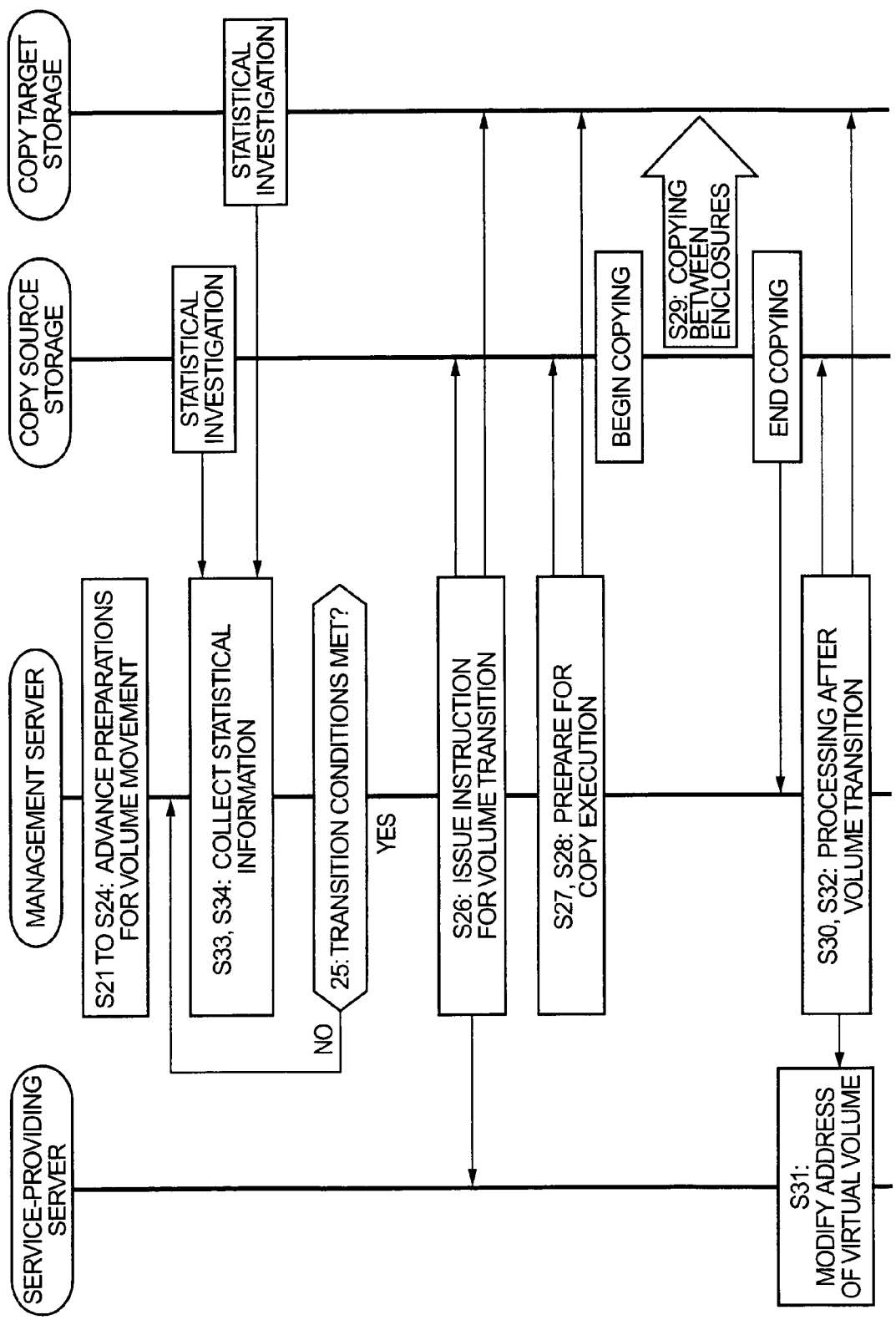
FIG. 11 is a sequence diagram showing the manner of execution of the processing in FIG. 10 by each portion; and, FIG. 12 is an explanatory drawing which schematically shows an application example of this aspect.

Based on FIG. 9 through FIG. 11, operation to relocate a volume in this storage system is explained. FIG. 9 is an explanatory diagram showing the principal portions of volume relocation processing. For convenience in the explanation, in FIG. 9 only two storage subsystems 100, 120 and one service-providing server 300 are shown.

The service-providing server 300 is assumed to be accessing the volume 124 of the storage subsystem 120 (S11). The volume address and initial unique ID of the volume 124 are allocated to a virtual volume by the virtual volume control portion 303.

The management server 200 periodically collects statistical information for the storage subsystems 100, 120. When the frequency of use of the volume 124 exceeds a prescribed threshold, the volume transition management portion 203 of the management server 200 decides on volume movement. The volume transition management portion 203 issues instructions to execute cross-enclosure volume copying to the copy source storage subsystem 120 and to the copy target storage subsystem 100 (S12). Further, the volume transition management portion 203 notifies the monitoring portion 302 of the service-providing server 300 of the fact that volume copying will be executed (S13). Through this notification, the service-providing server 300 ascertains the movement target of the volume to be moved 124.

In the copy source storage subsystem 120, the volume to be moved 124 is allocated to the dummy volume 125 (S14). The dummy volume 125 maintains a communication session established with the dummy volume 107 of the copy target storage subsystem 100. In place of this dummy volume 125, the actual volume 124 is allocated to the communication network for volume copying CN13.

In the copy target storage subsystem 100, the unused volume 109 secured in the reserved pool area 108 is allocated to the dummy volume 107 (S15). That is, in place of the dummy volume 107, the unused volume 109 is set in the communication network CN13. When this preparation of the copy source and copy target is completed, volume copying is executed between the storage subsystems 100, 120 (S16).

When volume copying is completed, an access path is set for the copied volume 109. By this means, the volume 109 can be used as the actual volume 104 (S17).

The virtual volume control portion 303 of the service-providing server 300 switches the access target from the volume 124 of the copy source storage subsystem 120 to the volume 104 of the copy target storage subsystem 100 (S18).

By switching the access target for the service-providing server 300, the copy source volume 124 is no longer used. This volume 124 is then returned to the reserved pool area 126 as an unused volume 127. When there is another occasion to move a volume from the storage subsystem 100 to the storage subsystem 120, this unused volume 127 will be used.

The above summarizes the overall operation. When a plurality of storage subsystems exist in a storage system, and paths for volume copying between storage subsystems are set, there is the possibility that a plurality of storage subsystems may be considered as copy target candidates. In this case, the storage subsystem with the lowest frequency of use can be selected from among the plurality of copy target candidates. Also, in cases in which a storage subsystem selected as a copy target has access paths from a plurality of service-providing servers, the access path with the lowest frequency of use may be used as the access path of the copy target volume.

FIG. 10 is a flowchart showing the overall processing when volumes are relocated between storage subsystems. As advance preparation, unused volumes are registered in reserved pool areas of each of the storage subsystems (S21). Also, dummy volumes are defined in communication paths for copying between storage subsystems (S22). Also, initial unique IDs are allocated to each of the volumes used by the storage subsystems (S23). And, the volume transition conditions are set (S24).

The management server 200 judges whether there exists a volume or file system (hereafter "volume or similar") satisfying the volume transition conditions set in advance (S25). If no volumes or similar exist which satisfy the volume transition conditions ("NO" in S25), the management server 200 enters standby until the timing for collection of statistic information arrives (S33). When the timing for collection of statistical information arrives ("YES" in S33), the management server 200 collects statistical information from each of the storage subsystems (S34). The management server 200 judges whether there has been a request to halt the storage system for purposes of maintenance, to modify the configuration or similar (S35), and if there has been a request to halt the system ("YES" in S35), processing ends. If there is no request to halt the system ("NO" in S35), processing returns to S25.

In this way, the management server 200 periodically collects statistical information from each of the storage subsystems (S33, S34), and performs monitoring to determine whether unevenness occurs in the states of use among the storage subsystems.

When unevenness occurs in the frequencies of use of volumes distributed among storage subsystems, and the volume transition condition is satisfied ("YES" in S25), the management server 200 issues notifications or instructions to the copy source storage subsystem and copy target storage subsystem, as well as to the service-providing server using the volume to be moved, regarding the execution of a volume transition (S26).

On receiving an instruction from the management server 200, the copy source storage subsystem allocates a dummy volume to the copy source volume to be moved (S27). On the other hand, in the copy target storage subsystem, when the instruction from the management server 200 is received an unused volume secured in the reserved pool area is selected, and this unused volume is allocated to the dummy volume (S28).

When preparations for volume copying are completed in the copy source storage subsystem and in the copy target storage subsystem, volume copying spanning storage subsystems is executed (S29).

When volume copying is completed, an access path is allocated to the copy target volume in the copy target storage subsystem, and a state enabling access by the service-providing server is set (S30). The service-providing server updates information on virtual volume allocation according to the copy target volume (S31). By this means, the service-providing server modifies the access target from the copy source volume to the copy target volume.

In the copy source storage subsystem, the copy source volume, which is no longer used, is returned to the reserved pool area (S32).

After completion of volume movement, data updates being performed during volume copying are reflected in the copy target volume. For example, data updates during volume copying are saved in the cache memory of the service-providing server or in the cache memory of the copy source storage subsystem, and after the completion of volume copying can be reflected in the copy target volume.

The manner of execution of the above processing by the management server, service-providing server, and each of the storage subsystems is indicated in the sequence diagram of FIG. 11. Instructions relating to volume settings and volume transitions within the storage system are performed mainly by the management server. Volume copying between enclosures are executed between the copy source storage subsystem and the copy target storage subsystem.

Figure 12:
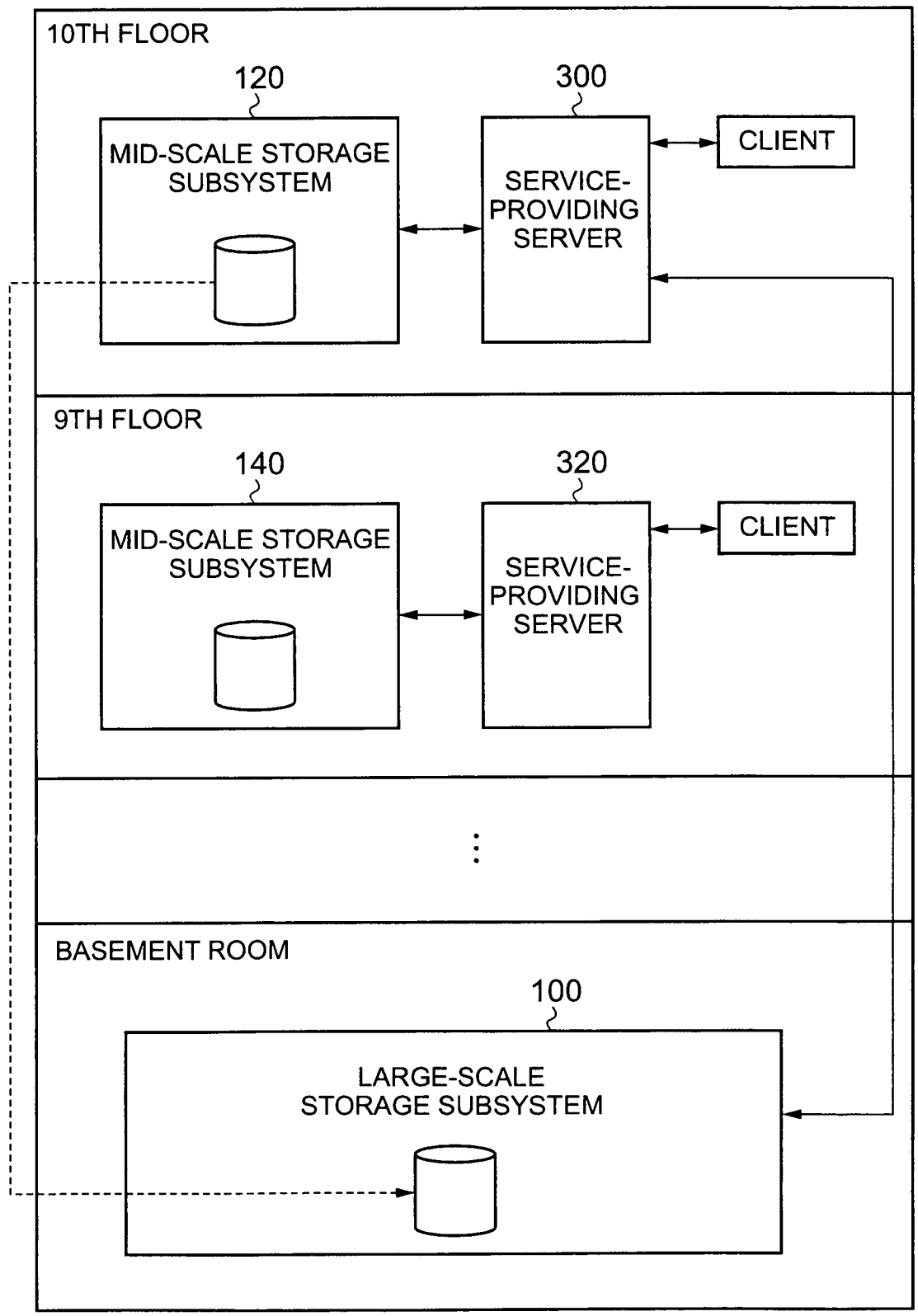

FIG. 12 is a schematic diagram showing a specific application example of this embodiment. For example, a large-scale storage subsystem 100 is installed in a basement room of a building, and mid-scale storage subsystems 120, 140 are installed on each floor. The storage subsystems 100, 120, 140 are connected via a SAN, LAN, or other communication network.

For example, suppose that on the 10th floor where the development division is located, there is an increase in accesses from clients, and there is an increase in the frequency of use of a particular volume or volume group (or a plurality of volumes used by a file system) in the storage subsystem 120.

Even if the physical distance between the service-providing server 300 and storage subsystem 120 is short, due to problems with the processing performance of the storage subsystem 120, there are cases in which large quantities of accesses cannot be processed in a short amount of time. In such cases, the volume or volume group on which access is concentrated is moved from the mid-scale storage subsystem 120 to the large-scale storage subsystem 100. There is an increase in the physical distance between the service-providing server 300 and the volume or volume group (file system) used by the service-providing server 300, but because of the high processing performance of the storage subsystem 100, response is improved.

Because of the above-described configuration of this embodiment, there are the following advantageous results. A configuration is employed in which volumes can be relocated automatically in a heterogeneous environment in which storage subsystems with different processing performance are intermixed. Hence even when unevenness occurs among the states of use of storage subsystems, volume relocation is possible without requiring the intervention of the system administrator. By this means the responsiveness of the storage system is improved, and storage resources in the storage system can be utilized effectively.

In this embodiment, a configuration is employed in which an initial unique ID enabling unique identification within the storage system is allocated to all actual volumes, and the initial unique ID is inherited by the copy target from the copy source. Hence it can easily be ascertained from which storage subsystem and to which storage subsystem a volume has been moved.

In this embodiment, the service-providing server is configured so as to access an actual volume through a virtual volume. Hence even when a volume is moved within the storage system, the service-providing server can maintain access throughout, without being affected by the volume transition.

In this embodiment, a dummy volume is allocated to a communication path for volume copying, in a configuration in which the communication session is maintained. Hence volume copying can be begun in a comparatively short amount of time.

This invention is not limited to the above-described aspect. A practitioner of the art can make various additions or modifications, without the scope of this invention. The embodiment describes a case of volume transitions between two or three storage subsystems, but this invention is not thereby limited, and volume transitions between four or more storage subsystems are possible.

In this embodiment, an example of two types of storage subsystem, which are a large-scale storage subsystem and mid-scale storage subsystems, is described; but application to various other environments is also possible, such as a high-performance storage subsystem, a moderate-performance storage subsystem, and a low-performance storage subsystem, or intermixtures of various other storage subsystems.

As the volume transition conditions, two types of condition were described, for cases in which a prescribed threshold is exceeded and cases in which a prescribed threshold is not met; but various other conditions can also be set. For example, movement of a specific volume can be prohibited. Also, the number of service-providing servers using a volume or volume group (number of shared hosts), or the rate of CPU use of a storage subsystem or amount of cache memory used can be taken into consideration when executing volume transitions.

What is claimed is:

1. A storage system using load balancing among systems of varying processing performance, comprising a plurality of types of storage subsystems comprising high-performance storage subsystems with relatively high processing performance, and low-performance storage sub-systems with low processing performance relative to the high processing performance of the high-performance storage subsystems, each storage subsystem providing one or more volumes, a service-providing server which accesses each of said storage subsystems to exchange data, and a management server, connected to each of said storage subsystems and to said service-providing server, to manage each of said storage subsystems, wherein (1) said management server comprises:
  a collection/analysis portion which collects and analyzes information relating to states of use of each of said storage subsystems;
  a volume transition management portion which, based on said analyzed states of use, moves volumes with relatively high frequencies of use from said low-performance storage subsystems to said high-performance storage subsystems, and moves volumes with relatively low frequencies of use from said high-performance storage subsystems to said low performance storage subsystems; and, wherein a communication path for said volume movement is preset prior to the beginning of said volume movement only between a high-performance storage subsystem and a low-performance storage subsystem, wherein no communication path for volume movement is so preset between low-performance storage subsystems, and wherein said communication path is preset between a high-performance storage system and a low-performance storage system under the condition that a communication session is established via said preset communication path,
  a unique identification information management portion which sets, for the volumes of each of said storage subsystems, unique identification information which is not affected by volume movement by said volume transition management portion;

(2) each of said storage subsystems comprises:
  an upper level interface control unit that controls data exchanges with the service-providing server;
  a lower level interface control unit that controls data exchanges with a plurality of memory drives;
  a memory unit that is shared by the upper level interface control unit and the lower level interface control unit,
  one or more actual volumes;
  a dummy volume for movement control, wherein one dummy volume is prepared for each said communication path;
  an unused volume secured in advance in a pool area;
  a copy control portion which performs volume copying spanning storage subsystems via said communication path, according to instructions from said volume transition management portion; and,
  an investigation portion, which collects information relating to states of use and transmits said information to said collection/analysis portion;

(3) said service-providing server comprises:
  a volume movement monitoring portion, which receives notification relating to said volume movement from said volume transition management portion; and,
  an access target modification portion, which modifies the access target to a volume which has been moved in said volume movement, based on said notification and on said unique identification information; and wherein in the movement source storage subsystem, the volume to be moved is allocated to said dummy volume for movement control;

in the movement target storage subsystem, said unused volume is allocated to said dummy volume for movement control;

the contents of the volume to be moved, and which is allocated to said dummy volume for movement control in the movement source storage subsystem, are volume-copied via said communication path to the unused volume allocated to said dummy volume for movement control in the movement target storage subsystem;

when said volume copying is completed, use of said volume-copied volume is begun; and, said moved volume is returned to said pool area as an unused volume.

2. A storage system, comprising:

a management server;

a plurality of service-providing servers; and a plurality of storage subsystems;

wherein the management server, the plurality of service-providing servers, and the plurality of storage subsystems are all interconnected by a first communication network;

wherein the plurality of storage subsystems include a first storage subsystem, a second storage subsystem, and a third storage subsystem, the first storage subsystem being connected to the second storage subsystem by a second communication network, and the first storage subsystem being connected to the third storage subsystem by a third communication network;

wherein the management server is arranged to perform volume configuration of the first, second, and third storage subsystems via the first communication network;

wherein each of the service-providing servers has access communication with each of the plurality of storage subsystems via the first communication network, under management by the management server;

wherein each of the storage subsystems comprises actual volumes, virtual volumes, and a pool of unused volumes, the actual volumes being accessed by the plurality of service-providing servers via the first communication network;

wherein the virtual volumes in the first storage subsystem include a first virtual volume used to establish a communication path between the first storage subsystem and the second storage subsystem via the second communication network, and a fourth virtual volume used to establish a communication path between the first storage subsystem and the third storage subsystem via the third communication network;

wherein the virtual volumes in the second storage subsystem include a second virtual volume used to establish the communication path between the first storage subsystem and the second storage subsystem;

wherein the virtual volumes in the third storage subsystem include a third virtual volume used to establish the communication path between the first storage subsystem and the third storage subsystem;

wherein the management server is arranged to manage volume movement between the first storage subsystem and the second storage subsystem over the second communication network, and between the first storage subsystem and the third storage subsystem over the third communication network, by judging the necessity of volume movement based on frequency of access to each actual volume by the service-providing servers, such that when volume movement is judged to be necessary because a frequency of access to an actual volume in the first storage subsystem exceeds a prescribed threshold, the management server issues to the first storage subsystem and to one of the second and third storage subsystems an instruction for execution of volume copying from the first storage subsystem to said one of the second and third storage subsystems, and sends information relating to the volume movement to the service-providing servers that use the actual volume to be copied;

wherein for volume movement from the first storage subsystem to the second storage subsystem, the first storage subsystem allocates an actual volume in the first storage subsystem to the first virtual volume, and the second storage subsystem allocates an actual volume in the second storage subsystem to the second virtual volume;

wherein for volume movement from the first storage subsystem to the third storage subsystem, the first storage subsystem allocates an actual volume in the first storage subsystem to the fourth virtual volume, and the third storage subsystem allocates an actual volume in the third storage subsystem to the third virtual volume; wherein after the actual volume to be copied in the volume movement from the first storage subsystem is allocated to the first virtual volume and the actual volume in said one of the second and third storage subsystems is allocated to the second or third virtual volume, respectively, volume copying is performed from the actual volume allocated to the first virtual volume in the first storage subsystem to the actual volume allocated to the second or third virtual volume, respectively, of said one of the second and third storage subsystems, an access path is set from the service-providing servers to the actual volume in said one of the second and third storage subsystems, and the actual volume in said first storage subsystem becomes one of the unused volumes in the pool of unused volumes of said first storage subsystem.

* * * * *